No. 720,365. PATENTED FEB. 10, 1903.
W. LEWINSKI.
STRAINER.
APPLICATION FILED SEPT. 19, 1902.
NO MODEL.
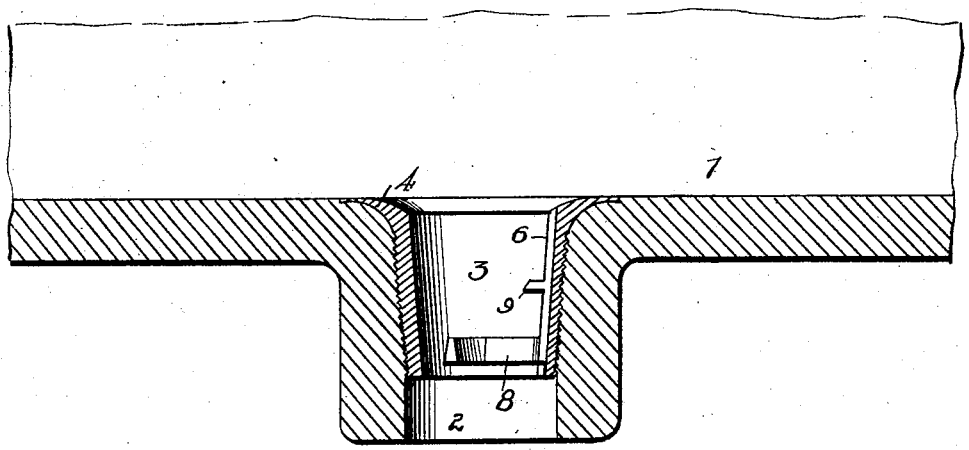
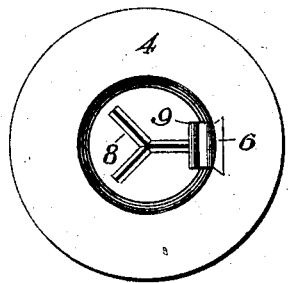 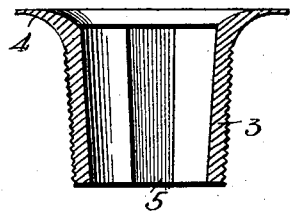
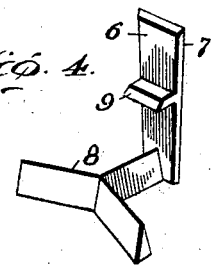
Witnesses
Inventor
William Lewinski,

UNITED STATES PATENT OFFICE.

WILLIAM LEWINSKI, OF LAKE GENEVA, WISCONSIN, ASSIGNOR TO HIMSELF, R. B. ARNOLD, W. E. BURTON, AND CHARLES S. FRENCH, OF LAKE GENEVA, WISCONSIN.

STRAINER.

SPECIFICATION forming part of Letters Patent No. 720,365, dated February 10, 1903.

Application filed September 19, 1902. Serial No. 124,037. (No model.)

*To all whom it may concern:*

Be it known that I, WILLIAM LEWINSKI, a citizen of the United States, residing at Lake Geneva, in the county of Walworth and State of Wisconsin, have invented certain new and useful Improvements in Strainers, of which the following is a specification, reference being had therein to the accompanying drawings.

My invention relates to new and useful improvements in strainers for washbasins, tubs, &c.; and its object is to provide an inexpensive device of this character adapted to be detachably secured within the outlet of the receptacle and held in position in such a manner as to prevent rotation thereof.

Another object is to so construct the strainer that it is held at a point removed from the surface of the receptacle to which it is connected; but it is provided with means whereby it may be readily grasped when it is desired to detach the same.

With the above and other objects in view the invention consists in the novel construction and combination of parts hereinafter more fully described and claimed, and illustrated in the accompanying drawings, showing the preferred form of my invention, and in which—

Figure 1 is a vertical section through a portion of a receptacle having my improved strainer in position. Fig. 2 is a plan view of the strainer and its casing detached. Fig. 3 is a central vertical section through said casing with the strainer removed, and Fig. 4 is a perspective view of the strainer detached.

Referring to the figures by numerals of reference, 1 is a suitable receptacle, such as a tub or basin, having an outlet 2, threaded internally for engagement with threads formed upon the outer surface of a tapered tubular casing 3. This casing is provided at its upper edge with a rounded flange 4, which lies within the upper surface of the bottom of the receptacle, and thereby a continuous smooth surface extends from the bottom of the receptacle into the casing.

A tapered dovetail groove 5 is formed longitudinally within one side of the inner surface of casing 3 and is adapted to receive a tapered slide 6, having beveled edges 7. A Y-shaped arm 8 extends from the lower end thereof at right angles thereto, and a lug 9 is also formed upon the slide at a point above the arm 8. It is obvious that the tapered slide will be firmly held in the groove 5 by the overhanging walls thereof, and the arm 8 will thus be maintained at all times in proper position across the lower end of the casing 3. Should it be desirable for any reason to remove the strainer, it is merely necessary to insert a finger under the lug 9 and the slide can be easily drawn upward.

In the foregoing description I have shown the preferred form of my invention; but I do not limit myself thereto, as I am aware that modifications may be made therein without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. The combination with a receptacle having an outlet; of a slide, a forked arm extending therefrom to form a strainer, means for detachably securing the slide in the outlet, and a lug upon the slide.

2. The combination with a receptacle having an outlet; of a casing secured in said outlet and having a dovetail groove, a slide detachably secured in said groove, an arm extending from the slide to form a strainer, and a lug upon the slide.

3. The combination with a receptacle having an outlet with threaded walls; of a casing within, and engaging the threads of, the outlet, a tapered slide detachably secured within a dovetail groove in the casing, a forked arm to the slide forming a strainer, and a lug upon the slide.

4. The combination with a receptacle having an outlet; of a casing secured in said outlet, and a Y-shaped strainer detachably secured in said casing at a point removed from the receptacle.

In testimony whereof I affix my signature in presence of two witnesses.

WILLIAM LEWINSKI.

Witnesses:
HOWARD W. BECKWITH,
LENA A. VOSS.